(No Model.) 2 Sheets—Sheet 1.

E. P. LYNCH.
WHEEL PLOW.

No. 376,535. Patented Jan. 17, 1888.

(No Model.) 2 Sheets—Sheet 2.
E. P. LYNCH.
WHEEL PLOW.

No. 376,535. Patented Jan. 17, 1888.

UNITED STATES PATENT OFFICE.

EDWARD P. LYNCH, OF DAVENPORT, IOWA.

WHEEL-PLOW.

SPECIFICATION forming part of Letters Patent No. 376,535, dated January 17, 1888.

Application filed October 14, 1887. Serial No. 252,367. (No model.)

*To all whom it may concern:*

Be it known that I, EDWARD P. LYNCH, of Davenport, in the county of Scott and State of Iowa, have invented certain Improvements in Wheel-Plows, of which the following is a specification.

My invention relates to that class of implements in which one or more mold-boards or plows proper are secured to and carried by a beam or beams, which latter are extended forward and carried at their rear ends by adjustable ground-wheels.

The aim of the invention is to combine with a plow of this character a rear steering-wheel adapted to be conveniently turned to the right or left in order that the operator may readily control the movement of the plow; and to this end it consists, primarily, in combining with the plow having front carrying-wheels the rear steering-wheel and devices for controlling its motion in a plow having, as usual, two guiding-handles, one of which is employed as a means of controlling the steering-wheel; also in various features of construction, which will be hereinafter more explicity described.

Figure 1:
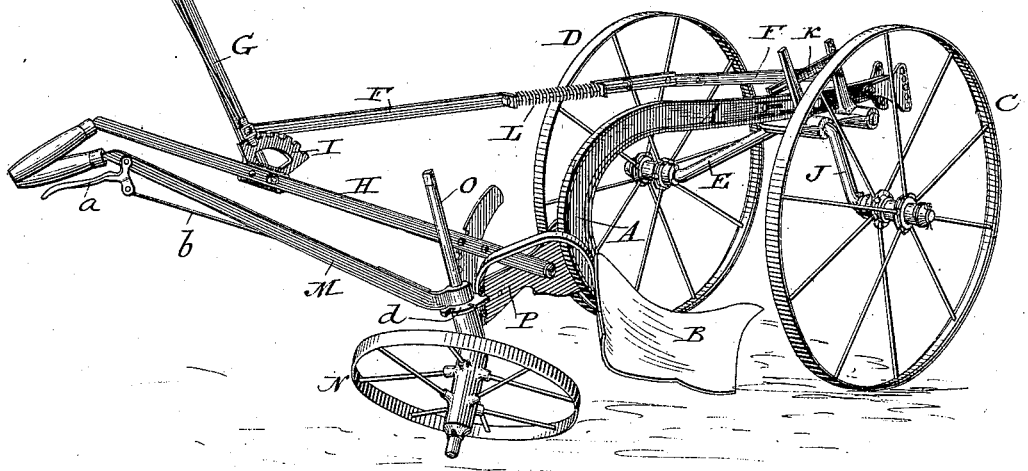
Figure 2:
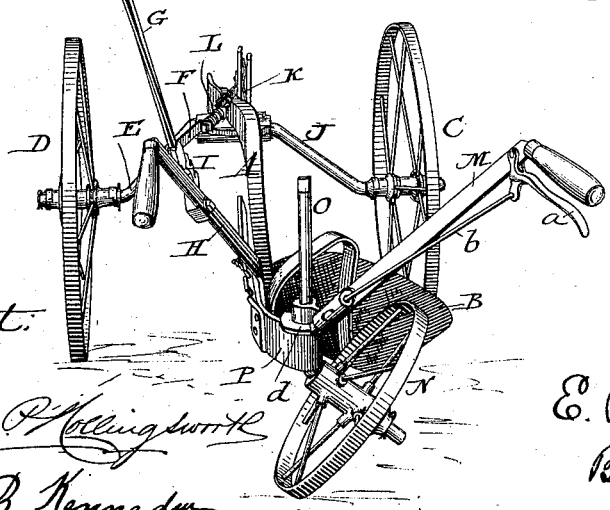
Figure 3:
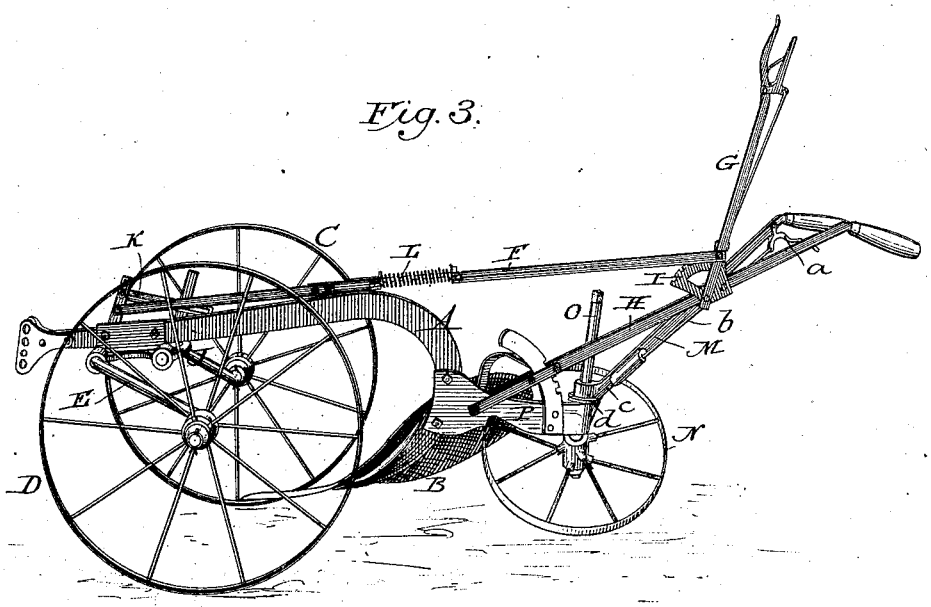

In the accompanying drawings, Figure 1 is a perspective view of my improved plow, the steering-wheel being in position to cause the turning of the implement to the left. Fig. 2 is a perspective view of the implement, looking from the rear. Fig. 3 is a perspective view looking from the land side.

Referring to the drawings, A represents an ordinary plow-beam having its rear end turned downward and secured rigidly to an ordinary mold-board, B, which is, in the present instance, constructed, in a manner now commonly practiced, without a landside, although the landside may be used, if desired. At its forward end the beam is supported by two ground-wheels, C and D, located on opposite sides. The land-wheel D is carried by a horizontal journal. The inner end of the axle E is bent upward to form a crank-arm and connected to a bar, F, which is extended thence rearward and attached to a hand-lever, G, pivoted to one of the plow-handles, H, or to any other suitable support on the plow or plow-frame. The lever G is provided with an ordinary latch or locking device to engage a sector-plate, I, by which it may be secured in different positions. This lever and its connections serve as a means of adjusting the land-wheel vertically in order to regulate the dept to which the plow enters the soil.

The furrow-wheel C is also mounted on a cranked axle, J, the upper end of which is mounted in a bearing on a beam, turned upward at its inner end in the form of a crank, and this crank connected by a link, K, to the crank of the land-wheel. Through this connection the two wheels are adjusted simultaneously without changing appreciably their relative height. The connection K may be made adjustable, as shown, in order that the relative heights of the two wheels may be varied according to the thickness of the slice or the depth of the furrow required.

In order to give the wheels an easy motion in riding over an uneven surface, I propose to divide the bar F at any suitable point in its length and to connect the two parts, as shown, by a spiral spring, L, or other yielding connection, which will allow the bar to lengthen and shorten to a limited extent when subjected to severe strains.

At its rear end the implement is provided, as usual in walking-plows, with two guiding-handles, H and M, adapted to be grasped by the operator in the ordinary manner.

The rear end of the plow is carried and guided by the steering-wheel N, located behind the mold-board on a lateral journal on the lower end of an upright shaft, O, which passes through and is carried by an arm, P, bolted rigidly to and extending rearward from the beam, so that by turning this shaft the wheel may be deflected to the right or left and the course of the plow deflected to or from the land. In the present instance I have represented this steering-wheel as standing at an inclination of forty-five degrees, or thereabout, toward the furrow side, in order that it may bear against the vertical wall of the furrow and resist the tendency of the mold-board to work toward the land, so that the plow may be used without a landside in a manner familiar to those skilled in the art. When, however, the landside is employed, the wheel and its guiding-shaft will both be arranged in vertical positions.

The implement is provided, as usual, with two handles, H and M, extending rearward and upward in position to be grasped by the operator in the same manner as in other walking-plows. The left handle, H, may be bolted rigidly to any suitable portion of the plow; but the right handle, M, is secured to the shaft of the steering-wheel, as shown in the drawings, so that it serves as a lever or handle by which to turn this wheel. It will be perceived that the handle thus applied serves a double purpose—first, that of assisting to control the depth of the plow and otherwise control its movement in the ordinary manner, and, second, that of turning the wheel and causing the latter to change or control the course of the plow, as may be required. The essence of my invention in this regard resides in connecting the guiding-handle with the steering-wheel, and it will be manifest to the skilled mechanic that the parts may be constructed in various forms and variously connected without essentially changing the mode of action or departing from the limits of my invention.

In order that the steering-wheel may be locked normally in position to cause the advance of the plow in a straight line, I propose to combine with the guiding-handle M a suitable locking device. In the drawings I have represented a thumb-latch, a, at its upper end, connected by a rod, b, to a sliding dog, c, located on the lower end of the handle, and arranged to engage a notched flange, d, on the arm P. When the wheel is in its normal position, the handle M is fixed rigidly in position, and may be used, in connection with the handle H, for guiding and controlling the plow in precisely the same manner that the rigid handles in general use are used. The handle H, being fixed against lateral motion, enables the operator to control the implement perfectly while moving the handle M to the right or left.

While I have described and illustrated my implement as constructed for operation by an attendant walking behind, it is manifest that the steering-wheel and its operating-handle may be used in the same manner on implements having a seat to carry the rider, the only requirement being that the handle shall be brought in such position that the operator may control the same while in his seat. I propose in some cases to control the steering-wheel by means of a lever applied thereto independently of the plow-handle, in which case the two handles of the plow will be fixed rigidly in place in the ordinary manner and used to perform their ordinary functions only.

Having thus described my invention, what I claim is—

1. In a plow having a beam or frame and a mold-board connected thereto, a swiveled steering-wheel, a rearwardly-extended plow-controlling handle connected to said steering-wheel and serving, by a side motion, to turn the same to the right or left, as required, and locking devices to hold said lever and wheel in their normal operative positions.

2. In a wheeled plow, a beam provided with a mold-board or plow proper, in combination with front carrying-wheels, a swiveled steering-wheel located in rear of the mold-board, and a laterally-movable hand-lever by which the attendant, walking in rear of the plow, is enabled to control the steering-wheel, and locking devices for holding said lever against lateral motion, whereby it is rendered available for the double purpose of adjusting the steering-wheel and of controlling the action of the machine.

3. In combination with a mold-board plow having front carrying-wheels, a swiveled steering-wheel located at the rear, and two guiding-handles, one of which is fixed against lateral motion and the other of which is connected to the steering-wheel to control its position.

4. In a mold-board plow, the guiding-handle fixed against lateral movement, the swiveled steering-wheel, the second handle connected with and serving as a means of adjusting said steering-wheel, and devices, substantially as described, for locking said movable handle and wheel in their normal position.

In testimony whereof I have hereunto set my hand this 18th day of June, 1887, in the presence of two attesting witnesses.

EDWARD P. LYNCH.

Witnesses:
FRED. M. DECKER,
GEO. H. FRENCH